United States Patent [19]
Kuesell et al.

[11] Patent Number: 5,703,282
[45] Date of Patent: Dec. 30, 1997

[54] PRESSURE SENSOR FOR PRESSURE DETECTION IN COMBUSTION CHAMBER OF INTERNAL COMBUSTION ENGINE

[75] Inventors: Matthias Kuesell, Kornwestheim; Andreas Duell, Stuttgart; Karl Bender, Tuebingen; Kay Borchert, Steinheim, all of Germany

[73] Assignee: Robert Bosch GmbH, Stuttgart, Germany

[21] Appl. No.: 734,240

[22] Filed: Oct. 16, 1996

[30] Foreign Application Priority Data

Oct. 19, 1995 [DE] Germany ............ 195 38 854.2

[51] Int. Cl.⁶ .................................. G01L 23/08
[52] U.S. Cl. .................. 73/115; 73/714; 73/727; 73/756
[58] Field of Search ............ 73/115, 116, 117.2, 73/117.3, 118.1, 119 A, 714, 756, 727

[56] References Cited

U.S. PATENT DOCUMENTS

| | | |
|---|---|---|
| 5,199,303 | 4/1993 | Benedikt et al. ............ 73/756 |
| 5,249,468 | 10/1993 | Benedikt et al. ............ 7/727 |
| 5,315,875 | 5/1994 | Benedikt et al. ............ 73/727 |
| 5,483,994 | 1/1996 | Maurer ............ 73/727 |
| 5,488,868 | 2/1996 | Ootake et al. ............ 73/115 |
| 5,503,023 | 4/1996 | Benedikt et al. ............ 73/115 |
| 5,559,280 | 9/1996 | Kovacich et al. ............ 73/727 |

*Primary Examiner*—George M. Dombroske
*Attorney, Agent, or Firm*—Michael J. Striker

[57] ABSTRACT

A pressure sensor for pressure detection in a combustion chamber of internal combustion engines of motor vehicles has a housing provided with an opening, a measuring element, a plunger arranged in the opening of the housing and having one end acting on the measuring element so that a measuring signal is produced proportionally to a pressure to be determined, the plunger directly abutting against the measuring element and having a material with a yielding point which is smaller than a breaking limit of a material of the measuring element, the end of the plunger which acts on the measuring element is spherical and abuts against the measuring element with such a contact surface that occurring stresses do not exceed a predetermined nominal value.

10 Claims, 1 Drawing Sheet

5,703,282

PRESSURE SENSOR FOR PRESSURE DETECTION IN COMBUSTION CHAMBER OF INTERNAL COMBUSTION ENGINE

BACKGROUND Of THE INVENTION

The present invention relates to a pressure sensor for pressure detection in a combustion chamber of internal combustion engines.

With the known pressure sensors of this type, a housing is provided with an opening in which a plunger is arranged. The opening is closed from one side by a diaphragm, and the end of the plunger abuts against the diaphragm. The other end of the plunger is in an operative connection with a measuring element. Also, a semi-ball is glued to this end of the plunger for a pressure transmission. In another embodiment, different elements are glued under one another. A glueing of different elements has, however the disadvantage that such connections in a mass production are difficult and expensive to treat. The connections can change there shape in time. Thereby is absolute measuring pressure sensors zero point changes can occur. It is especially disadvantageous when these changes occur in operation. The temperature resistance of the glueing connections is also not optimal. Also, the stamped layers used between the measuring element and the plunger are subjected over the lifetime of the pressure sensor to creep, effect, which can lead to uncontrolled zero point changes and thereby to measuring value errors.

SUMMARY OF THE INVENTION

Accordingly, it is an object of the present invention to provide a pressure sensor for pressure detection in combustion chambers of internal combustion engines, which avoids the disadvantages of the prior art.

In keeping with these objects and with others which will become apparent hereinafter, one feature of the present invention resides, briefly stated in a pressure sensor, in which the plunger abuts directly against the measuring element, the yielding point or limit of the material of the plunger is smaller than the breaking limit of the material of the measuring element, the end of the plunger is spherical, and the spherical end of the plunger abuts against the measuring element over such a contact surface of such a size that the occurring stresses do not exceed a predetermined nominal value.

When the pressure sensor is designed in accordance with the present invention, no zero point drift can occur during the service life of the pressure sensor. Simultaneously the pressure sensor can be produced in a simple and cost-favorable manner. No changes of the connections between the individual elements and no reduction of the pretensioning of the plunger occur anymore. Due to the utilized elasticity modulus of the materials, a high linearity of the measuring curve is provided. Since no changes of the geometry of individual elements is possible, a high stability of the sensitivity of this measuring curve is guaranteed. Furthermore, no dampening layers or elements are provided in the pressure sensor so that the measuring curve has a low hysteresis.

In accordance with further features of the present invention, the difference of the roughness of the surface of the end of the plunger and the roughness of the surface of the measuring element is smaller than or equal to two micrometer, preferably smaller than or equal to one micrometer.

The measuring element can be formed as a silicon chip in which the resistors connected in Wheatstone bridge are arranged.

The plunger can be guided in the opening of the housing. One of the opening can be closed with a diaphragm while the other end of the plunger can abut against the diaphragm.

Finally, the contact region of the plunger and the measuring element can be provided without a passivating layer covering the resistors. On the other hand, in a gap between the surface of the measuring element and the surface of the plunger, a gel-like mass can be arranged on the passivating layer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
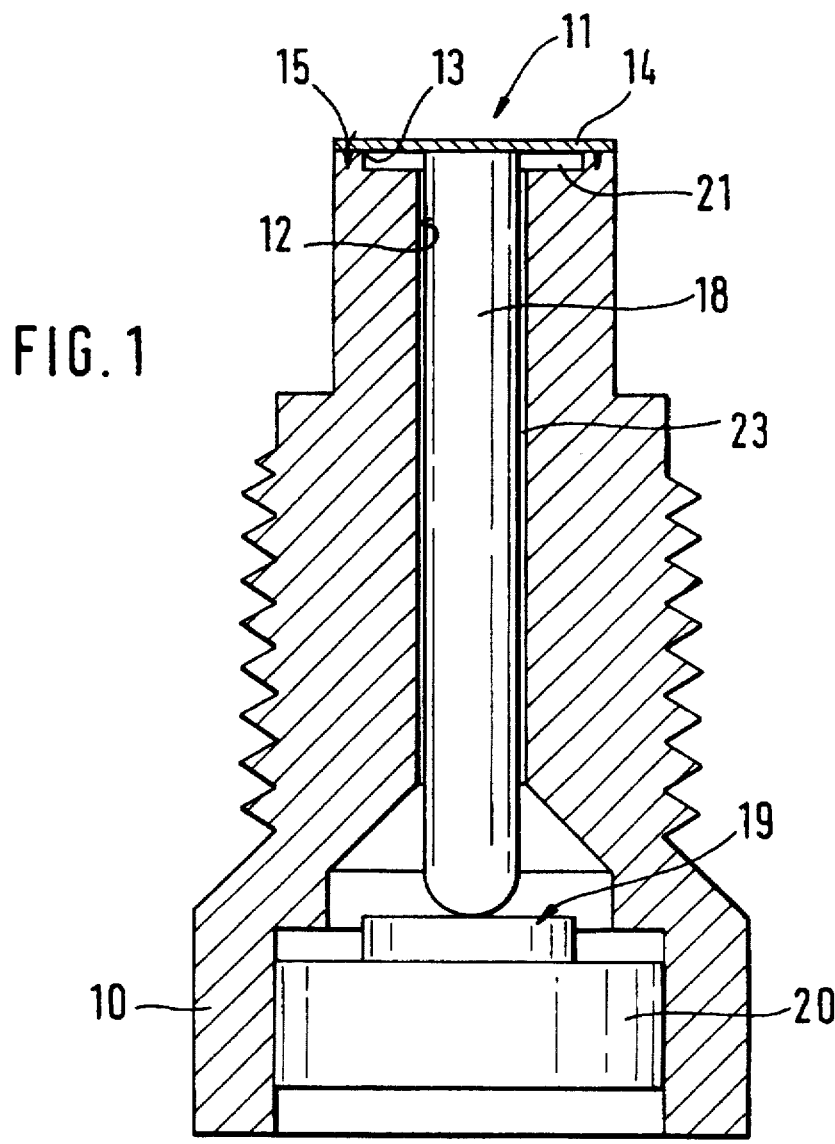
FIG. 1 is a view showing a section through a schematically shown pressure sensor in accordance with the present invention.

A pressure sensor for detecting of a pressure in a combustion chamber of an internal combustion engine is identified in FIG. 1 as a whole with reference numeral 11. It has a housing 10 provided with a central, throughgoing, stepped opening 12. An opening portion 13 of the opening 12 of the housing, which faces the combustion chamber, is closed with a diaphragm 14. The diaphragm 14 is welded to the housing 10 in the region of the edge at the end side 15 of the housing. A plunger 18 abuts with its one end against a central region of the diaphragm 14, or in other words in a bending region of the diaphragm. The other end of the plunger 18 cooperates with a measuring element 19. The diaphragm 14 is not absolutely necessary, and the pressure can be applied also directly onto the plunger.

The measuring element can be formed, for example, as a piezo-resistive element or piezo-electrical element. The piezo-resistive elements are elements which change their resistance value under the action of pressure. For this purpose for example thick layer resistors can be utilized. The materials for the measuring element can be such as cermet, contactive plastic, or metal.

The measuring element 19 is composed of resistors 25 which are arranged on a support 26 of silicon, a so called silicon-chip, by etching or printing. The measuring element 19 abuts with the support 26 against a countersupport 20 which is inserted in the opening 12 and fixedly connected with the housing 10. Not shown electrical components of an evaluating circuit can be mounted on the support 26 of the measuring element 19. Conductors of the evaluating circuit or the measuring element 19 can extend outwardly of the housing 10 of the pressure sensor 11 through not shown openings in the countersupport 20 so as to reach a not shown evaluating circuit and a control device of the internal combustion engine. A recess 21 is formed in the region of the opening 13, so that the opening 13 has a stepped shape.

A narrow gap 23 is provided between the wall of the opening 12 and the plunger 18. The gap 23 must be maintained as small as possible to provide a good heat transmission between the housing 10 and the plunger 18. Furthermore, a lateral guidance of the plunger 18 in the opening 12 must be unobjectionable.

Figure 2:
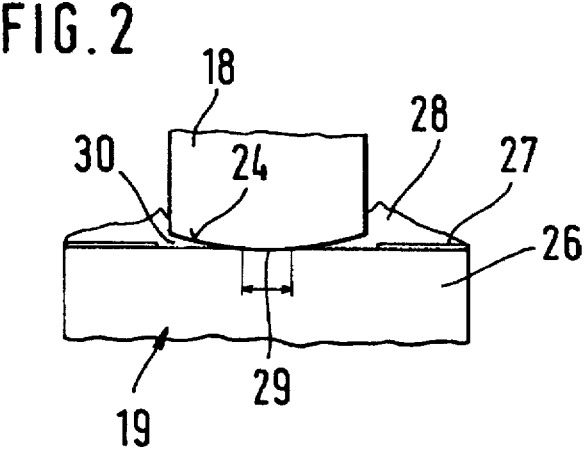
FIG. 2 is a view showing a fragment of the inventive pressure sensor.
Figure 3:
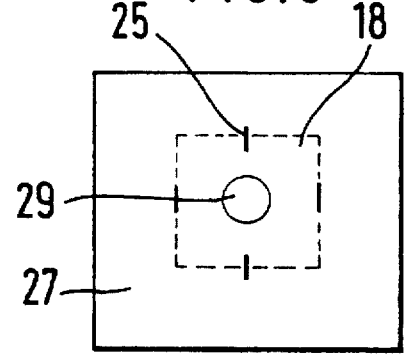
FIG. 3 is a plan view of a measuring element of the inventive pressure sensor.

The abutment region of the plunger 18 against the measuring element 19 is shown in detail in FIG. 2. The end of the plunger 18 is formed as a hemisphere 24. The radius of the hemisphere 24 has such a value that the contact region 29 between the hemisphere 24 and the measuring element 19 which forms the abutment surface, with consideration of the elasticity of the material of the measuring element 19, or in other words a support 26 (the silicon chip), reaches only a predetermined mechanical stress. It is to be understood that no impurities are allowed in this contact region 29, since they can cause voltage peaks and thereby damages to the components. The impurities usually can be both the impurities in the material of the plunger 18 and in the material of the measuring element 19, as well as particles located in the gap between the plunger 18 and the measuring element 19.

Furthermore, it should be mentioned that the roughness of the surface of the measuring element 19 approximately corresponds to the roughness of the surface of the hemisphere 24 of the plunger 18. In other words, the difference of the roughness of the surface of the hemisphere 24 and the surface of the measuring element 19 must be smaller than one micrometer. Also, the yielding point or limit of the material of the plunger 18 must be smaller than the breaking limit of the measuring element 19. If for example the radius of the hemisphere 24 of the plunger 18 is 20 mm, then a diameter of the contact region 29 is approximately 0.3 mm. The resulting stresses are approximately 300 N/mm$^2$. Furthermore, the roughness of the silicon or in other words the material of the support 26 of the measuring element 19 is in the region of several nanometer. The roughness of the surface of the hemisphere 24 of the plunger 18 composed for example of metal or ceramic is 100 nanometer. Silicon further has substantially higher breakage strength than the yielding point of the plunger material, or approximately 500–600 N/mm$^2$.

The resistors 25 of the measuring element 19 are arranged in form of a Wheatstone bridge circuit, squarely on the support 26 of the measuring element 19. The resistors 25 are located outside the contact region 29. Further, the resistors 25 are located under a passivating layer 27 composed of $Si_3N_4$. Since this passivating layer 27 has a low strength, the passivating layer is removed in the contact region. Silicon, or in the case of a layer structure of the support 26, silicon and silicon oxide ($SiO_2$) have a higher strength value than the passivating layer 27. Further, the end of the plunger 18 is surrounded by a gel 28 so that no dirt can penetrate into the gap 30 between the hemisphere 24 and the measuring element 19.

It will be understood that each of the elements described above, or two or more together, may also find a useful application in other types of constructions differing from the types described above.

While the invention has been illustrated and described as embodied in pressure sensor for pressure detection in combustion chamber of internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure sensor for pressure detection in a combustion chamber of internal combustion engines of motor vehicles, comprising a housing provided with an opening; a measuring element; a plunger arranged in said opening of said housing and having one end acting on said measuring element so that a measuring signal is produced proportionally to a pressure to be determined, said plunger directly abutting against said measuring element and having a material with a yielding point which is smaller than a breaking limit of a material of said measuring element, said end of said plunger which acts on said measuring element being spherical and directly abutting against said measuring element with such a contact surface that occurring stresses do not exceed a predetermined nominal value.

2. A pressure sensor as defined in claim 1, wherein a difference of a roughness of a surface of said end of said plunger and a roughness of a surface of said measuring element is not greater than two micrometers.

3. A pressure sensor as defined in claim 1, wherein a difference of a roughness of a surface of said one end of said plunger and a roughness of a surface of said measuring element is not greater than one micrometer.

4. A pressure sensor as defined in claim 1, wherein said measuring element is a silicon chip in which resistors connected in a Wheatstone bridge are arranged.

5. A pressure sensor as defined in claim 4, wherein said resistors are piezo-resistive resistors.

6. A pressure sensor as defined in claim 1, wherein said plunger and said opening of said housing are formed so that said plunger is guided in said opening of said housing.

7. A pressure sensor as defined in claim 1, wherein said opening has an end which is closed with a diaphgram, said plunger having another ending abutting against said diaphragm.

8. A pressure sensor as defined in claim 1, wherein said plunger abut against said measuring element in a contact region which does not have a passivating layer covering the resistors.

9. A pressure sensor as defined in claim 1, wherein said measuring element and said plunger have surfaces which are spaced from one another so as to form a gap; and further comprising a gel-like mass located in said gap.

10. A pressure sensor as defined in claim 9; and further comprising a passivating layer arranged on a surface of said measuring element, said gel-like mass being located on said passivating layer.

* * * * *